Sept. 27, 1949.  P. M. BROWN, JR  2,482,740
ROLLER AND DRUM MILL FOR FLAKING MICA
Filed Aug. 25, 1944   2 Sheets-Sheet 1

Inventor
Potter Maclay Brown, Jr.
By Stevens and Davis
Attorneys

Sept. 27, 1949. P. M. BROWN, JR 2,482,740
ROLLER AND DRUM MILL FOR FLAKING MICA
Filed Aug. 25, 1944 2 Sheets-Sheet 2
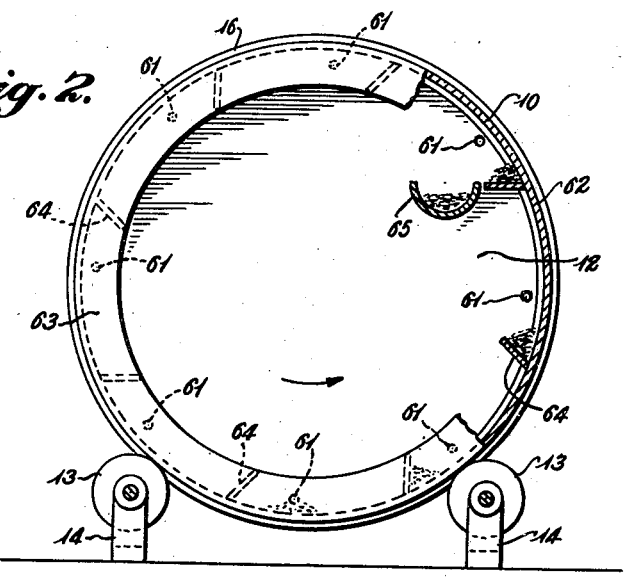
Fig. 2.
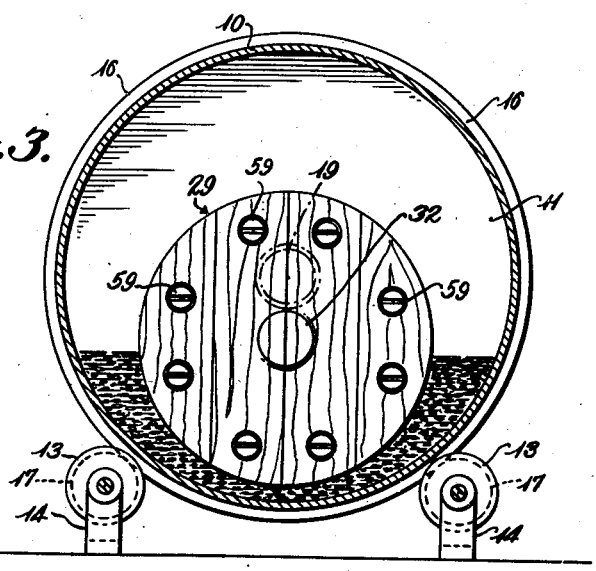
Fig. 3.
Fig. 6.
Inventor
Potter Maclay Brown, Jr.
By Stevens and Davis
Attorneys Patented Sept. 27, 1949

2,482,740

UNITED STATES PATENT OFFICE 2,482,740

ROLLER AND DRUM MILL FOR FLAKING MICA

Potter Maclay Brown, Jr., Richmond, Va., assignor to Richmond Mica Company, Richmond, Va.

Application August 25, 1944, Serial No. 551,248

1 Claim. (Cl. 241—171)

This invention relates to the manufacture of mica particles, and more particularly to an apparatus for breaking up lump mica to flakes of extremely small size.

Mica in finely divided flake form has wide usage because of its quality to act as a filler and because of its luster. For example, it is used in paints to impart body and a lustrous appearance to the resulting coating.

As the mica is mined in large lumps, it is necessary to break it down to a small flake size. Usual grinding operations are unsatisfactory because in reducing the lump mica to a small size, the mica becomes pulverized so that it is in the form of a powder rather than in the desired flake form. The resulting powdered mica does not have the luster that is characteristic of the flaked mica. The apparatus of the present invention does not tend to produce powdered mica but instead serves to split and break up the layers of the mica and to produce small size mica flakes having high luster.

Prior machines which have been used to reduce mica to small flakes have been unsatisfactory because they have involved several bearings and shafts within the machine and with which the mica comes in contact. These bearings and shafts tend to rust and this causes discoloration of the mica. Also, these bearings and shafts afford places for the accumulation of mica so that the mica is not uniformly acted upon by the machine. The apparatus of the present invention has no internal bearings or shafts and consequently the problem of rusting is overcome and the mica is uniformly subjected to the reducing action of the machine.

In the accompanying drawings, which show a preferred embodiment of the invention:

Figure 2 is a view of the right hand end of the machine of Figure 1.

Figure 3 is a section on the line 3—3 of Figure 1.

Figure 4 is an end elevation of one of the rollers of the machine.

Figure 5 is a section on the line 5—5 of Figure 4.

Figure 6 is a fragmentary view showing the interior of a modified drum.

Figure 1:
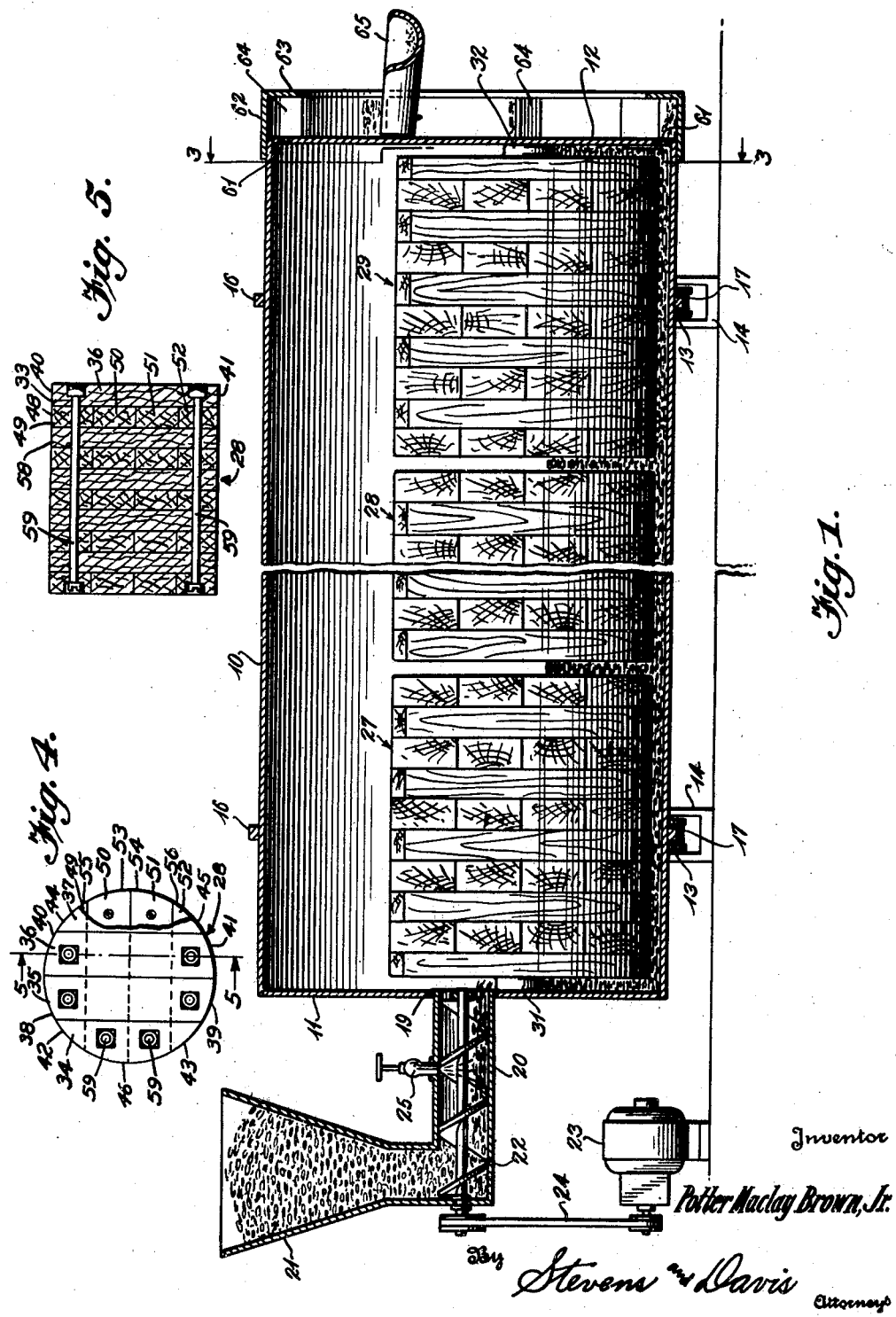
Figure 1 is a vertical longitudinal section through one of the machines, the internal parts being shown in elevation.

The machine shown in Figure 1 includes a cylindrical drum 10 closed at its ends by heads 11 and 12. For best results the drum is made of metal and the ends may be secured within the cylindrical wall in any desired manner as, for example, by welding. The entire inner surface of the drum is smooth and unbroken.

The drum is mounted for rotary movement about a horizontal axis by being supported upon a plurality of rollers 13 carried by standards 14. A pair of these rollers is on each side of a vertical plane through the axis of the drum so that the drum rests between these pairs of rollers. The drum may be rotated in any desired manner as by connecting one or more of the rollers to a motor 15.

To prevent endwise movement of the drum during its rotation, it is provided with a pair of circumferential bands 16 which enter peripheral grooves 17 in the rollers 13. These bands also serve to reenforce the drum and if additional reenforcement is desired other bands may be affixed about the cylindrical wall of the drum.

To admit the mica to the interior of the drum, the end 11 of the drum is formed with an axial opening 19. Into this opening 19 extends a closely fitting sleeve 20 and since the drum rotates about its horizontal axis, the sleeve 15 remains in substantially a sealing contact with the wall of the opening 19 during rotation of the drum. A hopper 21 communicates with the interior of the sleeve 20 and a screw impeller 22 carries the mica from the hopper 21 and into the drum 10.

The screw impeller 22 is rotated by means of a motor 23 through a belt drive 24. By adjusting the speed of rotation of the screw impeller 22, the rate of feed of the mica to the drum 10 may be varied and by driving this screw impeller at a constant speed a fixed rate of flow of mica to the drum is maintained. Water in controlled amounts may be supplied to the mica entering the drum by means of a valve 25 which directly enters the sleeve 20. Valve 25 is connected to a water supply through conduit 26.

Within the drum are a plurality of end-to-end rollers, and as here shown there are three rollers 27, 28, 29. These rollers preferably are larger in diameter than the radius of the drum, and it has been found that if the rollers are about ⅔ the diameter of the drum, satisfactory results are obtained. The rollers occupy substantially the entire length of the drum and their adjacent ends should lie close together.

Although a single roller extending the entire length of the drum would operate, it is preferable to use a plurality of rollers so that a large lump of mica will tend to distort only one roller and not the others. The undisturbed rollers, therefore, operate to break up the mica, without interference from the large mica lump under one of the rollers. This results in an improved operating efficiency of the machine.

To permit the free inlet and outlet of the mica at the ends of the drum, the end rollers 27 and 29 are formed at their endmost faces with axial projections 31 and 32, respectively. These projections 31 and 32 space the adjacent end face of the rollers from the end walls 11 and 12. For example, the projection 31 prevents the end face of roller 27 from blocking the discharge from sleeve 20.

It has been found that best results are attained if the rollers are made of wood and this is best accomplished by making the rollers of laminated construction. As the end grain of wood is more resistant to wear than is the face grain, the rollers are so built up that the periphery which is presented is largely made up of end grain. Rollers of this construction have an extensive operating life.

Figures 4 and 5 illustrate the construction of the rollers so that the end grain of the wood is presented about the major portion of the periphery of the rollers. As shown in the drawings, the periphery of each roller, like the inner surface of the drum, is smooth-surfaced. Each roller is made up of layers which are face to face lengthwise thereof and each layer is made up of several individual sections of wood. The end layer 33 is made up of sections 34, 35, 36 and 37. The center section 35 presents its end grain at the faces 38 and 39 and the center section 36 presents its end grain at the faces 40 and 41. The outer section 34 presents an end grain at 42 and 43 and the outer section 37 presents an end grain at 44 and 45.

As a consequence of this manner of building up the layer 33, a face grain of the wood is presented only at 46 and at a corresponding portion of the section 37 diametrically opposite from the surface at 46. These two face grains which are presented constitute only a small portion of the entire periphery of the layer 33.

The next layer 48 of the roller is made up of sections 49, 50, 51 and 52. These sections which constitute the layer 48 are positioned at right angles to the sections which make up the layer 33. The center sections 50 and 51 consequently present an end grain at 53 and 54, respectively, and the outer sections 49 and 52 present an end grain at 55 and 56, respectively. The opposite ends of the sections 49, 50, 51 and 52 present a corresponding end grain. The only face grain exposed by layer 48 is that of outer sections 49 and 52 midway of their lengths.

The layer 58 is made up of sections which extend in the same direction as the sections of the layer 33 and consequently the sections of the layer 58 are at right angles to the sections of the layer 48. This right angular relationship between the successive layers is carried out throughout the length of the roller. To retain the sections together, a plurality of bolts 59 are passed lengthwise through the roller, adjacent to its periphery. These bolts pass through both ends of every section.

It is important to notice that the face grain at 46 of the outer section 34 and the corresponding face grain of the outer section 37 are aside of the end grains 53 and 54 of the center sections 50 and 51 of the next adjacent layer 33. In like manner, the end grains at 38, 39, 40 and 41 of the center sections 35 and 36 of layer 33 lie aside of the exposed face grain of the outer sections 49 and 52 of layer 48. This relationship exists over the entire periphery of the roller so that where the least abrasive resistant face grain is exposed, the most resistant end grain is immediately aside thereto so that an over-all high resistance to wear is accomplished. Wear of the outer surface of the rollers is further minimized because a layer of mica forms over this surface and serves to protect the wood. It will also be noted that, as best shown in Fig. 1, the rollers are of such shape and are disposed in the drum in such manner that each and every point of every element of the cylindrical surface defined by the periphery of each of the rollers is substantially equally effective in its action upon the mica— except of course where irregularities in particle sizes in the mica charge momentarily cause lifting or displacement of a roller during the grinding operation. In other words, the rollers are of such shape and are disposed in the drum in such manner that, but for the presence in the drum of the mica undergoing treatment, they are adapted to make line-to-line contact with the drum.

The lump mica is reduced to small flake form by the constant slight rubbing action between the outer surface of the rollers and the inner surface of the drum. This serves to wear apart the layers of the lump mica and break the separated layers into minute flakes. The material which remains on the surface of the rollers is carried over to again be acted on between the rollers and drum. The mica is rolled out and squashed out between the rollers and drums and in this manner is constantly being replaced upon the rollers so that a thorough disintegrating action results. Some material may adhere to the drum and be carried upwardly to a high point from which it may drop down to be reworked and this serves to better intermix the material. Because of the manner in which the mica is flaked off and reduced the mica retains its full luster and life in the resulting minute flakes.

To permit the escape of the broken up mica particles the head end 12 is formed with a plurality of openings 61 and these openings should be close to the periphery of this head end. To receive the material which escapes through the openings 61 a cylindrical extension 62 is formed on the drum 10 and this cylindrical extension terminates in an inwardly turned retaining flange 63. Disposed in this trough so formed between the retaining flange 63 and the end wall 12 are a plurality of elevating plates 64 and it is preferable that one of these plates be provided for each of the openings 61.

The material escapes through the openings 61 during the passage of these openings through the lower portion of their rotary travel and the material so escaped is picked up by the plates 64 and carried to a high point on the upwardly moving side of the drum. A trough 65 is so located on this upwardly moving side of the drum that it catches the material which slides off of the elevator plates 64. The trough 65 slants away from the drum to carry the material to the next processing step.

As shown in Figure 6 the interior of the drum can be lined with wooden blocks 75 so that the mica is acted upon between the two wooden surfaces of the roller and these blocks. The blocks 75 should be so laid within the drum that their end grains are exposed so that the advantage of the increased resistance to wear of this end grain is obtained. The use of such a wooden facing within the drum is desirable because of its cheapness and the fact that the blocks may be replaced at low cost when worn.

It is possible to utilize a single drum to completely break down the initial lump mica to the desired final small flake size. However, it is preferable to employ several of the machines which have been described and through which the material will be successively passed to complete the breaking down of the mica. For example three such machines may be associated together. To facilitate the transfer of the material from one of the machines to the next successive machine they may be located side by side and with the discharge end of one adjacent to the receiving end of the next one in the series.

In such an arrangement of three drums connected in series, before the lump mica is delivered to the feed hopper of the first drum, it usually will be washed. This washing operation leaves the mica quite moist, but it is nevertheless usually necessary to supply water through inlet 25 to bring the liquid content in the first drum 10 up to about 18%. It has been found that for a drum diameter of 60 inches and a length of 12 feet, the drum being rotated at 16 R. P. M., a passage time through the drum of about 1½ hours is satisfactory for a feed of 900 pounds of mica per hour. Before entering the second drum, it is desirable to add additional water through its water inlet to bring the water content up to about 24%. The second drum is rotated at about the same speed as the first and about 1½ hours is likewise required to complete the processing of the mica therein. On entering the third drum, water is added through its water inlet to bring the liquid content up to 30%.

From the last drum the material may be carried by a trough to a collection sieve which will eliminate the oversize mica flakes. These oversize flakes are preferably returned to the system for reprocessing and may enter any drum of the series. The mica flakes of proper small size will ordinarily be dried for use.

What is claimed is:

Apparatus for continuously reducing mica to flake form which comprises an elongated drum having closure heads at both ends, means for supporting the drum for rotation about a horizontal axis, a plurality of rollers in end-to-end relation disposed longitudinally of the interior of the drum, said rollers being larger in diameter than the internal radius of the drum and the length of the rollers approximating their diameters, each roller including a plurality of layers of wood placed side-by-side lengthwise of the roller, each layer consisting of a plurality of parallel sections having their opposite ends exposed at the periphery of the roller, the sections of one layer being at right angles to the sections of the next layer whereby the exposed face grain of the outer sections of one layer are aside of the exposed end grain of the central sections of the next adjacent layer, one of said heads having an opening therethrough for the admission of lump mica to the drum interior, and the other head having an opening therethrough for the escape of flaked mica from the drum after having been acted upon by the rollers.

POTTER MACLAY BROWN, Jr.

REFERENCES CITED

The following references are of record in the file of this patent:

UNITED STATES PATENTS

| Number | Name | Date |
|---|---|---|
| 237,839 | Eichelberger | Feb. 15, 1881 |
| 413,388 | Coward | Oct. 22, 1889 |
| 425,886 | Kingsland | Apr. 15, 1890 |
| 533,384 | Traylor | Jan. 29, 1895 |
| 546,197 | Skelton | Sept. 10, 1895 |
| 563,459 | Divine | July 7, 1896 |
| 735,664 | Gent | Aug. 4, 1903 |
| 845,450 | Dobler | Feb. 26, 1907 |
| 1,055,599 | Ball | Mar. 11, 1913 |
| 1,064,680 | Bartley | June 10, 1913 |
| 1,126,085 | Riisager | Jan. 26, 1915 |
| 1,169,075 | Gerlach | Jan. 18, 1916 |
| 1,398,970 | Ledell | Dec. 6, 1921 |
| 1,428,687 | Ferencz | Sept. 12, 1922 |
| 1,540,588 | Alexander | June 2, 1925 |
| 1,661,597 | Floyd | Mar. 6, 1928 |
| 1,829,039 | Davenport | Oct. 27, 1931 |
| 2,030,239 | Byers | Feb. 11, 1936 |
| 2,185,158 | Price | Dec. 26, 1939 |
| 2,198,463 | Scott | Apr. 23, 1940 |
| 2,380,741 | Fisher | July 31, 1945 |

FOREIGN PATENTS

| Number | Country | Date |
|---|---|---|
| 12,003 | Great Britain | 1887 |
| 7,805 | Great Britain | 1904 |
| 19,665 | Great Britain | 1906 |
| 18,978 | Great Britain | Aug. 24, 1911 |
| 466,698 | France | Mar. 10, 1914 |
| 150,189 | Germany | Apr. 2, 1904 |
| 259,540 | Germany | May 8, 1913 |
| 400,229 | Germany | Aug. 2, 1924 |